United States Patent Office 3,423,945
Patented Jan. 28, 1969

3,423,945
METHOD OF FORMING AN UNDERWATER TRENCH
Jack O. Hill and James L. Harding, Morgan City, La., assignors, by mesne assignments, to Hycalog, Inc., a corporation of California
No Drawing. Continuation-in-part of application Ser. No. 448,281, Apr. 15, 1965. This application July 3, 1967, Ser. No. 650,665
U.S. Cl. 61—72.4                              24 Claims
Int. Cl. B63b 35/02, 35/04; E02d 3/12

ABSTRACT OF THE DISCLOSURE

A method is described for forming a trench to unconsolidated clayey sedimentary deposits under brackish or saline water. According to the method, strong mineral acid, such as sulfuric or phosphoric, is injected into or formed in the clayey sedimentary deposits along the line the trench is to take. The acid reacts with ions, such as carbonate ions and the bicarbonate ions, in the interstitial brackish or saline water trapped between the clay particles of the sediment. It also reacts with any organic material that may be present, and which may be binding the clay particles together to destroy or reduce their binding effect. These reactions produce gas, such as $CO_2$ and $H_2S$. The gases produced expand, force the particles apart, and carry the particles upward where they are dispersed in the water. The method can be used to form a trench or ditch in several ways. If a relatively shallow trench is to be formed, the method can be used economically to remove all of the clay to leave a clean trench. If a trench relatively large in cross-section is desired, the method can be used to break-up the material to be removed into clods or clumps of a size that can be readily removed by conventional underwater trenching methods. When forming the acid in place a gas that will combine with water to form the desired acid is injected. For example, $SO_2$ or $H_2S$ can be injected into the sedimentary deposits to react with the interstitial water and form sulfuric acid in place with the resultant reactions described above.

---

This is a continuation-in-part of application Ser. No. 448,281, filed Apr. 15, 1965 now abandoned, and entitled "Process for Treating Subaqueous Sediments."

This invention relates to a method of forming a ditch or trench in unconsolidated clayey sedimentary deposits under brackish or saline water.

Presently, when it is desired to lay items, such as pipelines or cables, in a trench under a body of water, the trench is formed by either dredging or hydraulic jetting or both where the bottom is terrigenous, i.e., it consists of sedimentary deposits containing unconsolidated clay, sand, and silt. Of these three materials, only the unconsolidated clay particles are cohesive to any degree.

Clay, as used herein, refers to a naturally occurring inorganic plastic material made up largely of particles less than 0.005 millimeter in diameter. These particles may consist of all lithogenous components (including flocculates) derived from pre-existing rocks, but primarily of the clay minerals montmorillonite, kaolinite, illite, and halloysite. Silt, which is sedimentary material of the same origin as the clay, consists of particles with diameters between 0.005 and 0.06 millimeter.

The cohesiveness of the clay particles is due primarily to (1) interparticle attraction, (2) the partial cementing action of any organic detritus, which may be present within the sedimentary mass, and (3) the weight of the overlying sediments. The latter is normally referred to as "compaction phenomena."

Although these unconsolidated clay particles possess cohesion their water content is very high, very often exceeding 100% by weight. This water is of two kinds, interstitial or interparticle water, sometimes referred to as connate water, and water of formation. Clay is made up of crystals shaped as rods or plates. These rods and plates are strongly attracted together and form larger "bundles," which in turn are attracted together to form clay particles consisting of a group of such bundles. These clay particles are also attracted together and they form even larger clay particles. As these particles of clay move together in a water environment, they trap water between them. Water can also filter down when the material is submerged, and enter the interstices between the clay particles and be trapped. This trapped water between the clay particles is called interstitial water. Water of formation consists of water molecules that are present within the crystallographic lattice structure of the individual clay mineral species making up the sedimentary deposits underneath the body of water.

Where the interstitial water is brackish or saline, it will contain one or more ions, the most common of which are the bicarbonate, carbonate, and sulfide ions. Quite frequently such water will contain all three of these ions.

In accordance with the present invention, a strong mineral acid, such as sulfuric or phosphoric, is injected into the sedimentary deposit along the line the trench is to be formed. This acid reacts with the bicarbonate, carbonate, and sulfide ions and the interstitial water to produce carbon dioxide gas and hydrogen sulfide gas as follows:

(1)    $$H^+ HCO_3^- \rightarrow H_2O + CO_2 \uparrow$$
Bicarbonate ion (2)    $$6H^+ + 3CO_3^= \rightarrow 3H_2O + 3CO_2 \uparrow$$
Carbonate ion (3)    $$2H^+ + S^= \rightarrow H_2S \uparrow$$
Sulfide ion In addition, the injected acid attacks any organic material that may be present in the sedimentary mass and acting as a binder between the particles. This reaction can produce hydrogen sulfide gas.

The gases produced by these reactions expand. As they do, they force the clay particles apart thereby destroying the cohesion between the particles. The expanding gas then carries the broken away clay particles upwardly and disperses the particles in the water above. It is not known how small the resulting clay particles are. As stated above, the clay particles are crystalline aggregates that consist of smaller clay particles, which are made up of bundles of clay crystals. The expanding gas will break down these aggregates into smaller particles consisting of one or more bundles of crystals. Apparently the resulting particles are small enough for them to adhere to the gas bubbles and be carried upward with the gas into the water above. In the examples described below, when the bottom sediments were treated with acid, a trench was left and only muddy water existed above and in the trench. The gases produced had removed not only the clay, but the sand and silt also.

To obtain the best desired results with the method of this invention, the interstitial water should be sufficiently brackish that it contains a minimum of about 18 parts per thousand of total dissolved solids. This 18 parts per thousand is determined on the basis of dry weight of solids per weight of water.

The acid can be formed in place by injecting a gas into the bottom sediments that will combine with the interstitial water to form the desired acid. For example, sulfur dioxide, $SO_2$, injected into the interstitial water forms sulfuric acid. Hydrogen sulfide gas could be injected for the same purpose.

Any acid having at least one replaceable hydrogen atom can be used in the practice of this invention. A concentrated inorganic acid is preferred, however, and especially one having at least two replaceable hydrogen atoms. Examples of the latter are sulfuric and phosphoric. Concentrated sulfuric (68° Baumé) is particularly advantageous for use in practicing this method. It is a low-cost acid and, when concentrated, very easy to handle and store. For example, concentrated sulfuric acid can be stored indefinitely in low-carbon steel tanks.

In practicing the invention, for best results, the acid should be injected into the bottom sediments below their upper surface. If the acid is poured onto the upper surface most of it will be neutralized by the saline or brackish water before it can react with the interstitial water between the clay particles. For a relatively shallow ditch or trench, the acid can be used to remove all of the material necessary to form the trench. To do this a device preferably having a plurality of small holes is forced into the sediment and moved along below the bottom surface while the acid is forced through the holes. The acid is injected just deep enough for the acid to remove the layer of material above it. Several passes may be necessary to obtain the desired trench.

For large trenches, it will probably be uneconomical to remove all of the sedimentary material with acid because it would require too much time as well as a large amount of acid. In these cases, the acid can be used to sever portions or layers of material from the sedimentary mass for easy removal by conventional means, such as mechanical dredging or jetting or both. To sever these portions, it is contemplated that the acid will be injected through a plurality of holes in a knife-like member to sever a layer of the sediment just ahead of the hydraulic or pneumatic jet or mechanical dredge, or whatever conventional trencher is being used. The severed portions should be removed before they can remold into the mass, which they will do if given enough time. By injecting the acid ahead of the knife-like member, it will break down the cohesiveness of the clay ahead of the member and permit it to be moved easily through the sediments. The acid will also coat the interface between the portion being severed and the remaining mass. The gases produced will bubble upwardly around the portions severed and keep the severed portions from remolding with the sedimentary mass for a period of time. If the layer is thin enough or enough acid is used, the gases will also break up the severed portion into lumps or clods as it escapes upward, thereby further simplifying the removal of this material.

Either of the above methods can be used to bury an existing conduit that is already laying on the bottom. In the first case, the trench is formed by injecting the acid into the sediments below the conduit. In the case of the larger trench, the acid is injected below the conduit and the jet, etc., arranged to remove the portion of material severed by moving alongside the conduit.

The amount of acid injected into a particular sediment will be determined by a number of factors, including the neutralizing capacity of the sediment to be treated and the volume of the sediment to be treated.

To determine the amount of acid to be used, core samples are taken from the sediment mass. These samples are taken to the laboratory and examined for (a) organic content, (b) moisture content and (c) the amount of clay present. These tests are conducted according to accepted engineering practices and principles of soil analysis.

At the start of a job, a diver can observe the action of the acid and provide the information necessary to adjust the rate of flow of the acid to obtain the desired result.

The following examples further illustrates this invention. They are not intended to limit the scope of this invention in any manner.

EXAMPLE 1

A field test was conducted in ten feet of water, in the western Mississippi Delta area, offshore Louisiana. A thirty-foot joint of 2½ inch pipe was lowered to the ocean floor. The sediments in this area were comprised of 6–8 inches of silty sand at the top, underlain by silty clay with thin seams of sand and organic matter down to a sediment depth of minus four feet.

A ¼ inch pipe was connected by a hose to a 55 gallon drum containing 66° Baumé $H_2SO_4$. This was allowed to drain by gravity flowage down the hose. A diver inserted the pipe which was a the terminus of the hose up to four feet into the sediment bottom and the following actions were noted:

(a) Some resistance was detected in penetrating the sand layer.
(b) Upon breaking through the sandy crust, the pipe penetrated the silty-organic clay with ease.
(c) Large volumes of gas bubbled up around the joint of pipe. The escaping gas carried bits of sediment with it (including the sand), leaving a clean, open ditch. One pass created a ditch approximately two inches wide and if a second pass had been made, a ditch large enough to receive the pipe would have been formed.

EXAMPLE 2

An acid ditching test was conducted in 54 feet of water, in the Bay Marchand area, offshore, Louisiana. The acid, once it was injected into the clay, performed as follows:

(a) It seemed to dissolve the clay or dig a hole about 3 feet deep with one application of acid.
(b) This hole was funnel shaped, and 8 to 10 inches in diameter.
(c) Gas bubbles could be seen lifting disassociated bits of clay out of the injected area leaving a ditch.
(d) The acid would continue to work for about 15 minutes before the bubbles would cease.
(e) If a plain piece of hollow pipe with the end open and a hose attached to it, so that acid comes out of the bottom of the hollow pipe, was shoved with light pressure into this hard clay, the pipe would penetrate the clay. Without the acid, it would be difficult if not impossible to shove the pipe into this particular clay.

The method of this invention could also be used to free objects buried in unconsolidated clayey bottom sediments below a body of brackish or saline water.

From the foregoing it will be seen that this invention is one well adapted to attain all of the ends and objects hereinabove set forth, together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of forming a trench along the bottom of a body of brackish or saline water where the bottom is an unconsolidated clayey sedimentary deposit, comprising the steps of inserting an acid injecting device into the bottom sediment, injecting a concentrated inorganic acid through the device into the bottom sediments to react with the ionic constituents in the interstitial water trapped between and within the particles of clay in the sedimentary deposit and any organic material that binds the particles together to produce gases which expand, break the particles apart into smaller particles, and disperse the resulting smaller particles into the water above, and moving the device to inject acid into the bottom sediments along the line of the desired trench until a trench of the desired size has been formed.

2. The method of claim 1 in which the acid has at least two replaceable hydrogen atoms.

3. The method of claim 2 in which the acid is sulfuric.

4. The method of claim 2 in which the acid is phosphoric.

5. A method of forming a trench along the bottom of a body of brackish or saline water where the bottom is an unconsolidated clayey sedimentary deposit, comprising the steps of injecting a strong inorganic acid below the top of the sedimentary deposit along the line of the desired trench to react with the ionic constituents in the interstitial water trapped between and within the particles of clay in the sedimentary deposit and any organic material that binds the clay particles together to produce gases which expand, break the particles apart into smaller particles, and disperse the resulting smaller particles into the water above to sever a layer of such sediment, and remove the layer so severed.

6. The method of claim 5 in which the acid has at least two replaceable hydrogen atoms.

7. The method of claim 6 in which the acid is sulfuric.

8. The method of claim 6 in which the acid is phosphoric.

9. The method of claim 5 with the further step of repeating the first two steps until a trench of the desired depth is obtained.

10. A method of forming a trench along the bottom of a body of brackish or saline water, where the bottom is an unconsolidated clayey sedimentary deposit, comprising the steps of inserting the end of an injecting device into the bottom sediment, injecting a sulfurous gas through the device into the bottom sediment to combine with the interstitial water between and within the particles of clay in the sedimentary deposit and form sulfuric acid which will react with the ionic constituents in the interstitial water and any organic material binding the clay particles together to produce gases which expand, break the clay particles apart into smaller particles, and disperse the resulting smaller particles into the water above, and moving the device to inject gas into the bottom sediments along the line of the desired trench until a trench of the desired size has been formed.

11. The method of claim 10 in which the gas is hydrogen sulfide.

12. The method of claim 10 in which the gas is sulfur dioxide.

13. A method of placing a conduit for fluids, electrical conductors, etc., in a trench where the conduit lies on the bottom of a body of brackish or salt water and the bottom is a clayey sedimentary deposit, comprising the steps of inserting an acid injecting device into the bottom sedimentary deposits below the conduit, injecting a strong inorganic acid through the injecting device into the sedimentary deposit to react with the ionic constituents in the interstitial water located between and within the particles of clay in the bottom sediments and any organic material binding the particles together to reduce the binding effort of the organic material and to produce gases that expand, move the particles apart and break them into smaller particles, and disperses the resultant smaller particles into the water above, and moving the end of the injecting device along below the conduit to form a trench into which the conduit can sink.

14. The method of claim 13 in which the acid has at least two replaceable hydrogen atoms.

15. The method of claim 14 in which the acid is sulfuric.

16. The method of claim 14 in which the acid is phosphoric.

17. A method of placing a conduit for fluid, electrical cables, etc., in a trench where the conduit lies on the bottom of a body of brackish or salt water and the bottom is clayey sedimentary deposit, comprising the steps of inserting an injecting device into the bottom sedimentary deposit below the conduit, injecting a sulfurous gas through the device into the bottom sediments to combine with the interstitial water between and within the particles of clay in the sedimentary deposit and form sulfuric acid to react with the ionic constituents in the interstitial water and any organic material binding the clay particles together to reduce the binding effect of the organic material and to produce gases that expand, break the clay particles apart into smaller particles, and disperse the resulting smaller particles into the water above, and moving the device along the conduit to inject gas into the bottom sediments below the conduit to form a trench below the conduit into which the conduit can sink.

18. The method of claim 17 where the gas is hydrogen sulfide.

19. The method of claim 17 where the gas is sulfur dioxide.

20. A method of placing a conduit for fluids, electrical conductors, etc., in an underwater trench where the conduit lies on clayey sedimentary bottom material and interstitial water containing at least 18 parts per thousand of total dissolved solids, comprising the steps of moving the discharge end of an acid injecting device through the bottom sedimentary deposit below the conduit, injecting a concentrated sulfuric acid through the injecting device into the sedimentary deposit to react with the ionic constituents in the interstitial water between and within the particles of clay in the sediment and any organic binder present to reduce the interparticle cohesiveness of the clay particles and to produce gases that expand, break the clay particles apart into smaller particles, and disperse them into the water above to form a trench below the conduit into which the conduit can sink.

21. A method of forming an underwater trench in bottom sediments containing unconsolidated clay particles having interstitial water between the particles with a total dissolved solids content by weight of about 18 parts per thousand or higher, comprising the steps of moving the discharge end of an acid injecting device through the bottom sediments along the line of the desired trench, injecting a concentrated inorganic acid through the device in the direction it is traveling to cause the acid to contact the clay particles ahead of the device and the clay particles adjacent the abutting surfaces of the sedimentary mass on either side of the path of the injecting device to cause the acid to react with the interstitial water trapped between and within said clay particles and any organic binder holding the particles together to reduce the binding ability of the organic material and to produce gases that expand, and break the clay particles apart into smaller particles to cause portions of the sedimentary deposits to be severed from the mass, and removing the severed portions to form a trench before the portions can remold themselves back into the sedimentary mass.

22. The method of claim 21 in which the acid has at least two replaceable hydrogen atoms.

23. The method of claim 22 in which the acid is sulfuric.

24. The method of claim 22 in which the acid is phosphoric.

References Cited

UNITED STATES PATENTS

| Re. 23,963 | 3/1955 | Collins | 61—72.4 |
| 2,258,001 | 10/1941 | Chamberlain | 175—64 X |
| 2,271,005 | 1/1942 | Grebe | 175—64 X |
| 3,077,740 | 2/1963 | Hemwall | 61—36 |
| 3,256,695 | 6/1966 | Bodine | 61—72.1 X |

FOREIGN PATENTS 378,604   7/1923   Germany.

EARL J. WITMER, *Primary Examiner.*

U.S. Cl. X.R.

61—36